(12) United States Patent
Miyazaki

(10) Patent No.: US 7,944,512 B2
(45) Date of Patent: May 17, 2011

(54) RECEIVER AND RECEIVING METHOD

(75) Inventor: Satoshi Miyazaki, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/722,329

(22) Filed: Mar. 11, 2010

(65) Prior Publication Data

US 2011/0051012 A1 Mar. 3, 2011

(30) Foreign Application Priority Data

Aug. 31, 2009 (JP) .................... 2009-200465

(51) Int. Cl.
*H04N 5/445* (2006.01)
(52) U.S. Cl. ........................................ 348/731
(58) Field of Classification Search .................. 348/731, 348/725, 726, 552, 553; 725/38
See application file for complete search history.

(56) References Cited

U.S. PATENT DOCUMENTS

| 4,241,449 A * | 12/1980 | Tanaka | 455/186.1 |
| 5,497,508 A * | 3/1996 | George | 455/161.2 |
| 6,721,018 B1 * | 4/2004 | Shintani et al. | 348/731 |
| 2008/0022303 A1 * | 1/2008 | Lu et al. | 725/38 |
| 2008/0222900 A1 | 9/2008 | Lee | |

FOREIGN PATENT DOCUMENTS

| JP | 2005-303526 | 10/2005 |
| JP | 2005-354631 | 12/2005 |
| JP | 2007-258875 | 10/2007 |
| JP | 2009-060243 | 3/2009 |

* cited by examiner

*Primary Examiner* — Paulos M Natnael
(74) *Attorney, Agent, or Firm* — Knobbe, Martens, Olson & Bear LLP

(57) ABSTRACT

A receiver selecting a channel to be received based on a channel list enumerating receivable channels includes: a memory capable of storing the channel list; a first tuner configured to perform a quick scan to scan a partial frequency band out of a predetermined frequency band to obtain first service information including information of a service corresponding to the channel received by the quick scan; a channel list generation module configured to generate the channel list based on the first service information obtained by the first tuner and store the channel list in the memory; a second tuner configured to perform, in parallel with the quick scan by the first tuner, a full scan to scan the entire predetermined frequency band to obtain second service information including information of a service corresponding to the channel received by the full scan; and a channel list updating module configured to update the channel list stored in the memory based on the second service information after the full scan by the second tuner is completed.

6 Claims, 6 Drawing Sheets

RECEIVER AND RECEIVING METHOD

CROSS-REFERENCE TO RELATED APPLICATIONS

This application is based upon and claims the benefit of priority from the prior Japanese Patent Application No. 2009-200465, filed on Aug. 31, 2009; the entire contents of which are incorporated herein by reference.

BACKGROUND ON THE INVENTION

1. Field of the Invention

The present invention relates to a receiver capable of searching for receivable channels from a predetermined frequency band.

2. Description of the Related Art

Accompanying digitalization of communication and broadcasting and advancement in data compression technology, it is becoming possible to manage numerous channels as compared to analog communication and broadcasting. Particularly, as receivers receiving a digital broadcast, receivers capable of receiving in plural systems such as terrestrial digital broadcasting, cable digital broadcasting, satellite digital broadcasting, and the like are becoming popular.

A receiver capable of receiving in plural systems, particularly a receiver that receives a broadcast has a very wide effective frequency band as a receiving object, and thus requires a function to set channels by searching for channels to be used from this frequency band. In digital broadcasting for example, as measures to search for channels, there are known a full scan to scan the entire effective frequency band and a quick scan to scan a partial band with priority out of the effective frequency band to increase the scan speed (see, for example, JP-A 2005-303526 (KOKAI)).

However, to scan the entire effective frequency band, the frequency band used for broadcasting can be as wide as several hundred MHz, and thus a long period of time is needed until channel setting is completed and the user is able to view the channels. On the other hand, when performing the quick scan of a partial band with priority out of the frequency band, a non-scanned frequency may exist depending on the rule of prioritizing. Thus it is possible that all of the available channels cannot be covered.

BRIEF SUMMARY OF THE INVENTION

As described above, it has been difficult with conventional receivers and receiving methods to complete setting of available channels in a short time without omission. The present invention is made in view of such a problem, and an object thereof is to provide a receiver and a receiving method capable of completing setting of available channels in a short time without omission.

To achieve the above-described object, a receiver according to one aspect of the present invention is a receiver selecting a channel to be received based on a channel list enumerating receivable channels and includes: a memory capable of storing the channel list; a first tuner configured to perform a quick scan to scan a partial frequency band out of a predetermined frequency band to obtain first service information including information of a service corresponding to the channel received by the quick scan; a channel list generation module configured to generate the channel list based on the first service information obtained by the first tuner and store the channel list in the memory; a second tuner configured to perform, in parallel with the quick scan by the first tuner, a full scan to scan the entire predetermined frequency band to obtain second service information including information of a service corresponding to the channel received by the full scan; and a channel list updating module configured to update the channel list stored in the memory based on the second service information after the full scan by the second tuner is completed.

DETAILED DESCRIPTION OF THE INVENTION

Figure 1:
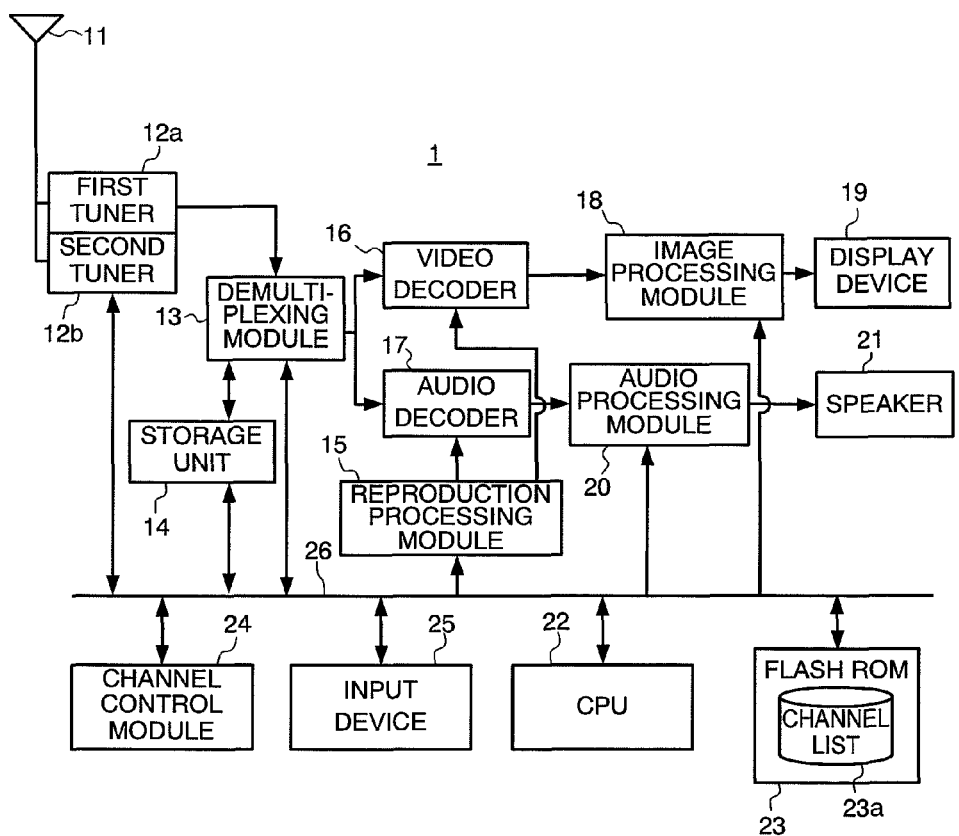
FIG. 1 is a block diagram showing the structure of a receiver of a first embodiment.

Hereinafter, embodiments of the present invention will be described based on the drawings. FIG. 1 is a block diagram showing a receiver 1 according to a first embodiment of the present invention.

As shown in FIG. 1, the receiver 1 of this embodiment is a digital television having a recording function, for example. The receiver 1 includes an antenna 11, a first tuner 12a and a second tuner 12b, a demultiplexing module 13, a storage unit 14, a reproduction processing module 15, a video decoder 16, an audio decoder 17, an image processing module 18, a display device 19, an audio processing module 20, a speaker 21, a CPU 22, a flash ROM 23, a channel control module 24, and an input device 25, which are connected with each other by a bus 26.

The first tuner 12a selects a desired broadcast wave (broadcast station) from a signal taken in via the antenna 11. The first tuner 12a is capable of receiving an arbitrary channel (frequency) from a predetermined frequency band, for example an entire frequency band used for broadcasting, and performing a scan operation on an arbitrary frequency band by external control. Note that in the embodiment shown in FIG. 1, the first tuner 12a selects a desired broadcast wave from a signal taken in via the antenna 11, but the desired broadcast wave may be selected from a signal taken in via a cable from a cable television station, or the like. The second tuner 12b has a structure and a function common to those of the first tuner 12a, and selects a desired broadcast wave from a signal taken in via the antenna 11, similarly to the first tuner 12a.

The demultiplexing module 13 separates a video signal and an audio signal multiplexed in a broadcast wave and outputs the video signal and the audio signal to the video decoder 16 and the audio decoder 17, respectively. The reproduction processing module 15 controls the video decoder 16 and the audio decoder 17, and reproduces (decodes) the contents separated in the demultiplexing module 13.

The video decoder 16 decodes the video signal separated in the demultiplexing module 13, and outputs a decoded digital video signal to the image processing module 18. On the other hand, the audio decoder 17 decodes the audio signal separated in the demultiplexing module 13 and outputs a decoded digital audio signal to the audio processing module 20. That is, the demultiplexing module 13, the video decoder 16, and the audio decoder 17 function as a demodulator in the receiver 1 according to this embodiment.

The storage unit 14 includes, for example, a hard disk drive, an optical disk drive capable of writing in a recordable optical disk, and/or the like, and stores the contents of a received broadcast program in a state of being decoded by the video decoder 16 and the audio decoder 17. The storage unit 14 may be an external storage device such as a DVD recorder or an external HDD, or may be an internal storage device such as an internal HDD or a flash memory.

The image processing module 18 and the audio processing module 20 perform predetermined audio processing and video processing on the decoded digital video signal and digital audio signal, and output the video signal and the audio signal after being processed to the display device 19 and the speaker 21, respectively.

The flash ROM 23 is a memory storing a channel list 23a. The channel list 23a is a data table listing channels receivable by this receiver 1 or services such as program names corresponding to the channels and provided to the user. The channel control module 24 has a function to control the first tuner 12a and the second tuner 12b to select a broadcast wave, and control the first tuner 12a and the second tuner 12b to generate/update the channel list 23a.

The input device 25 is an input interface such as operation switches or a remote control device, for example. The CPU 22 (Central Processing Unit) controls the respective functional elements constituting the receiver 1 based on an instruction signal from a user inputted via the input device 25.

Figure 2:
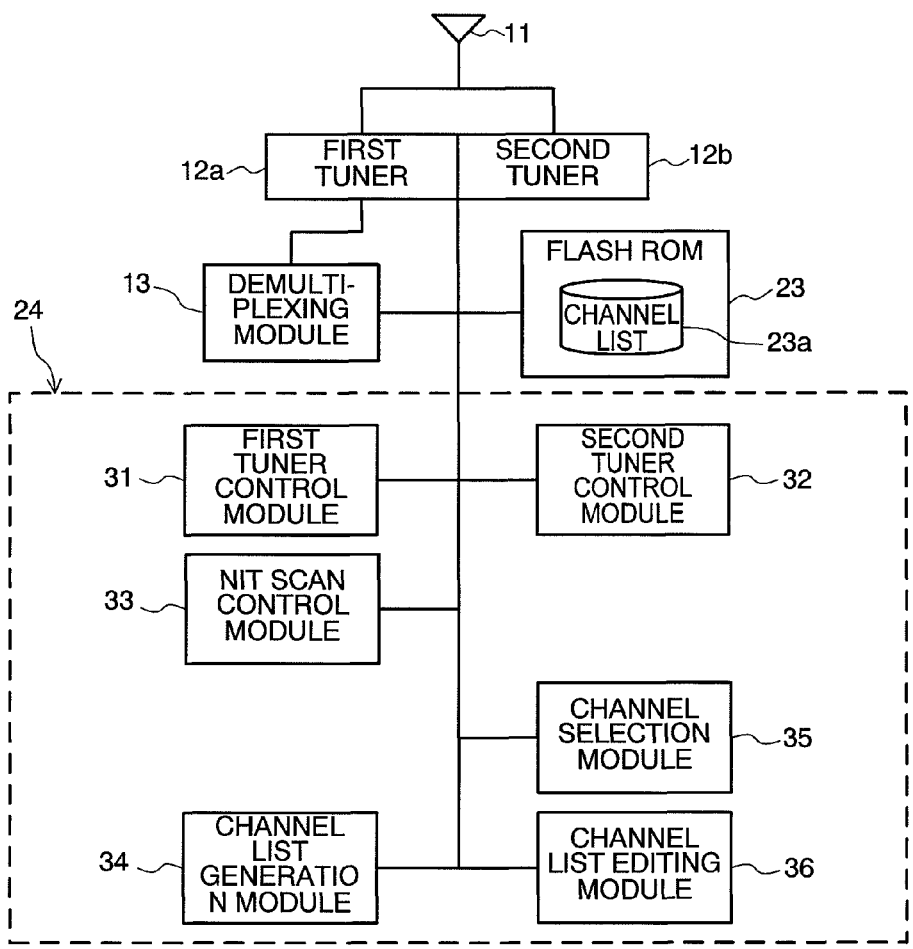
FIG. 2 is a block diagram showing a functional structure of a channel control module in the receiver of the first embodiment.

Next, with reference to FIG. 2 and FIG. 3, the channel control module 24 in the receiver 1 of this embodiment will be described in detail. As shown in FIG. 2, the channel control module 24 in this embodiment has a first tuner control module 31, a second tuner control module 32, an NIT scan control module 33, a channel list generation module 34, a channel selection module 35, and a channel list editing module 36.

In the receiver 1 of this embodiment, for allowing the user to obtain information of available channels and services provided for each channel in advance, the channel list 23a is created as an initial operation. That is, the channel list 23a includes all the channels receivable by the receiver 1 and services (contents/program names, or the like) provided using these channels.

Generation of the channel list 23a requires a search of the entire effective frequency band, but when the entire frequency band is scanned, it takes a long period of time. On the other hand, by narrowing the frequency band to be searched to a partial frequency band in advance, it is possible to reduce searching times, but it is possible that all the channels cannot be covered. Accordingly, in the receiver 1 of this embodiment, a tuner for scanning only a partial frequency band and a tuner for scanning the entire frequency band are provided, and thereby it is made possible to increase speed of channel list creation without omission.

The first tuner control module 31 controls the first tuner 12a to perform channel selection. Further, the first tuner control module 31 controls the first tuner 12a to perform a quick scan to scan a partial frequency band with priority out of the receivable frequency band of the first tuner 12a. That is, the first tuner control module 31 has two functions, controlling the first tuner 12a and controlling the quick scan. There are various methods proposed for quick scan, but in this embodiment, a method reducing the frequency band to be searched using NIT information included in digital broadcast waves is used.

The NIT information (Network Information Table) is a table including channel configuration information (information of channels allocation) in a network, and information of channels of a frequency or the like corresponding thereto, and is included in a digital broadcast wave. Besides, the broadcast wave includes an SDT (Service Description Table) describing organization channels and information of services related to the organization channels such as commissioned broadcaster names, as well as EIT (Event Information Table) describing information related to programs such as program names, broadcasting dates, and broadcasting contents.

As the SDT or EIT, there exist a local information (actual) as information corresponding to channels on which they are transmitted, and other station information (other) as information corresponding to other channels belonging to a common network (common NIT). That is, when it is possible to obtain NIT having local information and other station information, it is possible to obtain not only the modulation method, symbol rate, central frequency, and corresponding service name (program name) of this channel, but also information of channels allocation in the network and information of other channels. The first tuner control module 31 of this embodiment uses this system to narrow down frequencies to be scanned, so as to increase the scan speed. The NIT scan control module 33 performs scan control using such an NIT. In the description below, a quick scan by such a method may also be referred to as an NIT scan.

The second tuner control module 32 controls the second tuner 12b to perform channel selection. Further, the second tuner control module 32 controls the second tuner 12b to perform a full scan to scan the entire receivable frequency band of the second tuner 12b. A full scan operation by the second tuner 12b and the second tuner control module 32 is performed simultaneously in parallel with a quick scan by the first tuner 12a and the first tuner control module 31. Scan results of the full scan by the second tuner 12b and the second tuner control module 32 are sent to the channel list editing module 36.

The channel list generation module 34 generates the channel list 23a based on the NIT obtained by the scan performed by the NIT scan control module 33. The channel list 23a is a list enumerating channels receivable by the receiver 1 and corresponding program information or the like. The channel list 23a is provided to the user via the display device 19 based on an instruction signal from the user accepted via the input device 25. Further, the channel list 23a is basic information for a selection operation performed by the first tuner 12a and the second tuner 12b.

The channel selection module 35 controls channel selection in the first tuner 12a and the second tuner 12b based on an instruction signal from the user inputted with the input device 25 and the channel list 23a. That is, the channel selection module 35 has a function to perform a selection operation of the receiver 1.

The channel list editing module 36 edits the channel list 23a stored in the flash ROM 23. Comparing the quick scan by the first tuner 12a and the first tuner control module 31 and the full scan by the second tuner 12b and the second tuner control module 32, the former will be completed earlier when they are started simultaneously in parallel. Then as soon as a result of the quick scan is obtained, the channel list generation module 34 generates a channel list based on the result of the quick scan. Since the channel list generated at this time is obtained by the quick scan with narrowed frequencies to be scanned, there is a possibility that some other valid channels exist. Therefore, the channel list editing module 36 updates the contents of the channel list in an after-the-fact manner based on a result of the full scan. Specifically, the channel list editing module 36 compares the contents of the channel list generated by the channel list generation module 34 with the result of the full scan, and adds information which should be added to the channel list.

Next, with reference to FIG. 1 to FIG. 3, operations of the channel control module 24 in the receiver 1 of this embodiment will be described.

When power is turned on in an initial state that the channel list 23a is not stored in the flash ROM 23, or when an instruction signal such as reset is inputted by the user via the input device 25, the CPU 22 instructs the channel control module 24 to generate a channel list. When instructed so, the first tuner control module 31 activates the first tuner 12a to start the NIT scan operation. For example, the first tuner control module 31 starts a frequency scan by predetermined frequency steps from the lowest frequency among the receivable frequencies of the first tuner 12a (step 41, which will be expressed as "S41" below). The first tuner 12a sends a signal received during the frequency scan to the first tuner control module 31. Here, in the case where the channel list 23a does not exist or the first tuner 12a is performing a scan operation, the channel selection module 35 (and the first tuner 12a) cannot accept a channel selection instruction from the user. In other words, it is a state that the user cannot view a program or the like.

In parallel with starting the NIT scan operation by the first tuner control module 31, the second tuner control module 32 activates the second tuner 12b to start the full scan operation. For example, the second tuner control module 32 starts a frequency scan by predetermined frequency steps from the lowest frequency within the receivable frequencies of the second tuner 12b (S42). The first tuner 12b sends a signal received during the frequency scan to the second tuner control module 32. Similarly to the first tuner control module 31, in the case where the channel list 23a does not exist or the second tuner 12b is performing a scan operation, the channel selection module 35 (and the second tuner 12b) cannot accept a channel selection instruction from the user.

The first tuner control module 31 receives a signal received by the first tuner 12a and checks to see whether the received signal includes the NIT (S43). Until the NIT is recognized, the first tuner control module 31 controls the first tuner 12a to keep scanning the received frequencies at predetermined frequency steps (S3, No).

When presence of the NIT is recognized in the received signal received by the first tuner control module 31 (S43, Yes), the first tuner control module 31 sends the NIT to the NIT scan control module 33.

Upon reception of the NIT, the NIT scan control module 33 checks to see whether the NIT includes other station information (S44). This is because when the NIT includes other station information, this NIT can be used to obtain information of all broadcasting waves belonging to the same network. When the NIT includes other station information (S44, Yes), the NIT scan control module 33 extracts channel information of all stations from the NIT and sends the information to the first tuner control module 31 (S45).

When the NIT does not include other station information (S44, No), the NIT scan control module 33 extracts frequency information and so on from the local station information of the NIT (S46). Subsequently, the NIT scan control module 33 estimates a frequency (frequency with search priority) at which it is highly possible that a broadcast wave exists based on the extracted frequency information, and sends this frequency with search priority to the first tuner control module 31.

Upon reception of the frequency with search priority, the first tuner control module 31 continues the scan operation of the first tuner 12a based on the frequency with search priority. That is, the module continues the scan operation only for the frequency with search priority and frequencies in the vicinity thereof. As a result of such a scan operation, when the first tuner control module 31 recognizes the NIT, the first tuner control module 31 sends the NIT to the NIT scan control module 33. The NIT scan control module 33 extracts service information such as program information from the received NIT, and sends the extracted service information to the first tuner control module 31 (S47). This scan operation is repeated until all frequencies with search priority are scanned. Finally, the first tuner control module 31 obtains channel information including all service information obtained (channel information of all stations existing at the frequencies with search priority and frequencies in the vicinities thereof), and the first tuner 12a and the first tuner control module 31 stop the scan operation (S45).

When channel information of all stations is obtained, the first tuner control module 31 sends the obtained channel information to the channel list generation module 34. The channel list generation module 34 generates the channel list 23a based on the received channel information (S48), and stores the list in the flash ROM 23 (S49).

When the scan operation is stopped, the first tuner control module 31 switches the operation state of the first tuner 12a to a normal operation. The normal operation is an operation to select a channel based on an instruction signal from the user via the input device 25 and the channel list 23a, and send a received signal of the selected channel to the demultiplexing module 13 (S50). Thus, even when the second tuner 12b is in scan operation, the user is able to receive a broadcast based on the channel list 23a generated by the channel list generation module 34.

On the other hand, since the full scan requires a time longer than the NIT scan, the second tuner control module 32 continues the full scan operation by the second tuner 12b (S51) even after the channel list 23a is generated. The full scan operation is continued even after the quick scan by the first tuner 12a and the first tuner control module 31 is finished and the first tuner 12a turns to the normal operation (S51, No).

When the scan of the entire receivable frequency band of the second tuner 12b is finished (S51, Yes), the second tuner control module 32 generates all band channel information corresponding to the entire frequency band based on the received signal, the NIT, and any other information received from the second tuner 12b during the full scan, and the generated all band channel information is sent to the channel list editing module 36. The channel list editing module 36 compares the channel list 23a stored in the flash ROM 23 with the all band channel information received from the second tuner control module 32, and complements any information not included in the channel list 23a stored in the flash ROM 23 to update the channel list 23a (S52).

Once the channel list 23a is updated, the second tuner control module 32 stops the scan operation of the second tuner 12b (S53). Incidentally, the second tuner 12b can be used as a tuner to simultaneously receive plural broadcast waves. In this case, the second tuner control module 32 may switch the operation of the second tuner 12b from the scan operation to the normal operation instead of stopping the scan operation of the second tuner 12b.

In this manner, with the receiver 1 of this embodiment, the quick scan using the NIT included in a broadcast wave and the full scan to scan the entire receivable frequency band are performed in parallel, and the channel list is generated as soon as the quick scan is finished. Thus, a receiving operation of the receiver 1 can be started in a shorter time as compared to the case where only the full scan is performed. Further, the channel list is generated earlier by the quick scan, and the tuner is made to function as a normal tuner as soon as the quick scan is completed. Thus, the user can start viewing early even when the full scan performed in parallel is still in operation. With the receiver 1 of this embodiment, an already created channel list is updated based on information obtained by a full scan after the full scan is finished. Accordingly, channel information without omission can be obtained.

Figure 5:
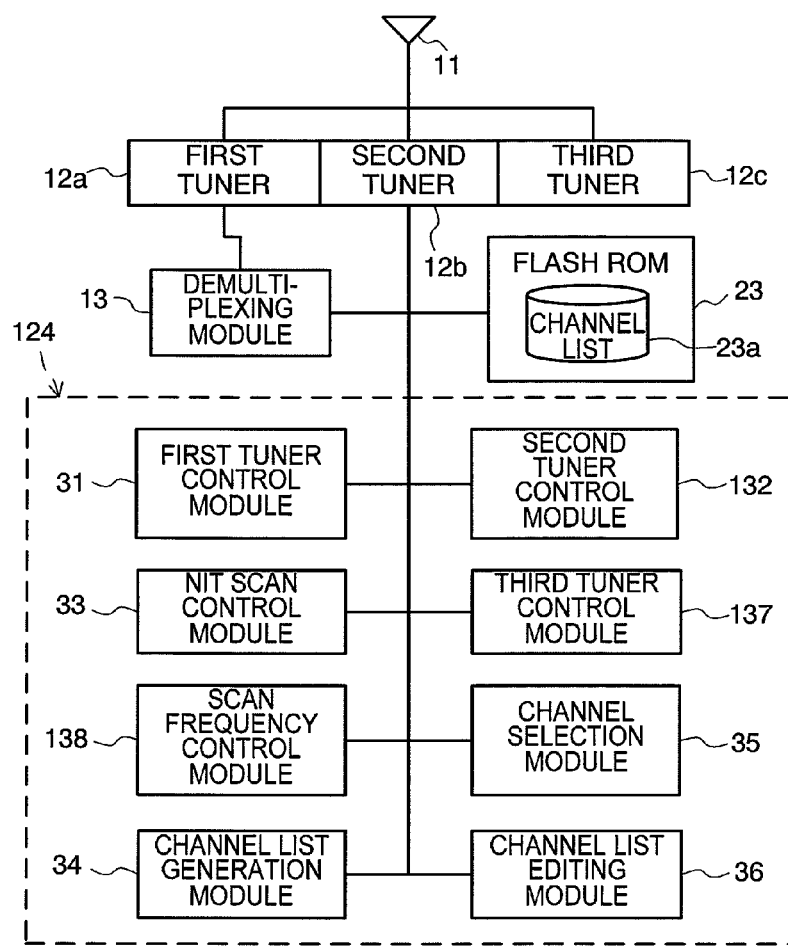
FIG. 5 is a block diagram showing a functional structure of a channel control module in the receiver of the second embodiment.
Figure 6:
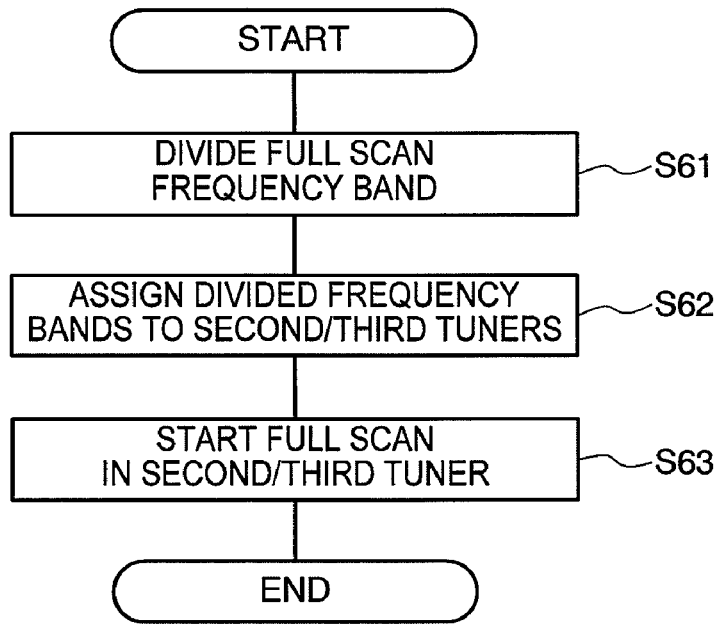
FIG. 6 is a flowchart showing a full scan operation of the receiver of the second embodiment.

Next, with reference to FIG. 4 to FIG. 6, a receiver 2 according to a second embodiment will be described in detail. The receiver 2 according to the second embodiment is made by further adding a tuner to the receiver 1 according to the first embodiment. Thus, in FIG. 4 and FIG. 5, elements common to the receiver 1 of the first embodiment are denoted by common reference numerals, and duplicating descriptions are omitted.

Figure 4:
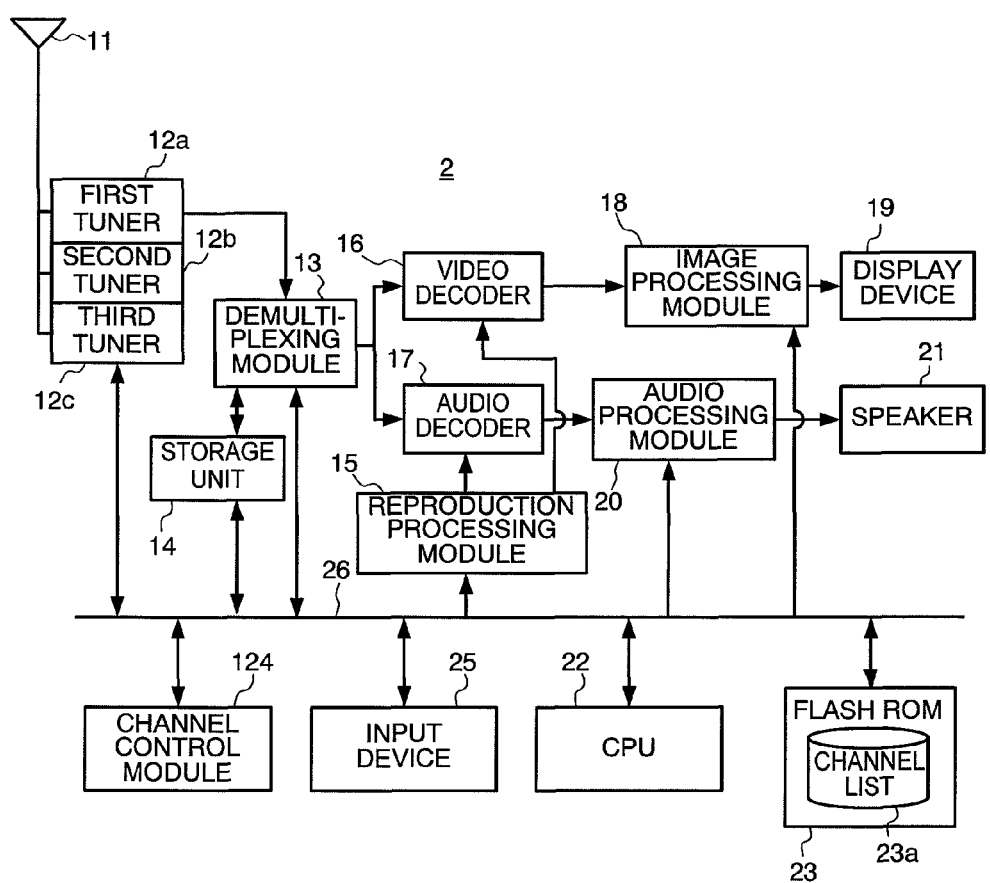
FIG. 4 is a block diagram showing the structure of a receiver of the second embodiment.

As shown in FIG. 4, the receiver 2 of this embodiment further includes a third tuner 12*c* in addition to the first tuner 12*a* and the second tuner 12*b* of the receiver 1 of the first embodiment. Further, as shown in FIG. 5, a channel control module 124 according to this embodiment further includes a third tuner control module 137 and a scan frequency control module 138 in addition to the channel control module 24 of the receiver 1 of the first embodiment.

The third tuner 12*c* has a structure and a function common to those of the first tuner 12*a* and the second tuner 12*b*, and selects a desired broadcast wave from a signal taken in via the antenna 11, similarly to the first tuner 12*a* and the second tuner 12*b*. The third tuner 12*c* is paired with the second tuner 12*b* performing the full scan operation in the first embodiment, and performs the full scan operation.

The second tuner control module 132 in this embodiment has a structure and a function common to those of the second tuner control module 32 of the first embodiment, but is different in that it controls the second tuner 12*b* to perform the full scan to scan the entire predetermined frequency band of the second tuner 12*b*. That is, the second tuner control module 132 performs the full scan of an entire given frequency band, as is different from the first embodiment.

The third tuner control module 137 corresponds to the second tuner control module 132 and controls the third tuner 12*c* to perform a channel selection or a channel scan. The third tuner control module 137 controls the third tuner 12*c* to perform a full scan to scan an entire predetermined frequency band. The full scan operation performed by the third tuner 12*c* and the third tuner control module 137 is performed in parallel with the quick scan by the first tuner 12*a* and the first tuner control module 31 and the full scan by the second tuner 12*b* and the second tuner control module 132. Scan results of the full scan performed by the second tuner 12*b* and the second tuner control module 132 as well as the third tuner 12*c* and the third tuner control module 137 are sent to the channel list editing module 36.

In the full scan operation performed by the second tuner 12*b* and the second tuner control module 132 as well as the third tuner 12*c* and the third tuner control module 137, the scan frequency control module 138 divides a scan frequency and assigns divided frequencies to the second tuner control module 132 and the third tuner control module 137. In this embodiment, there are two tuners performing the full scan operation, the second tuner 12*b* and the third tuner 12*c*. Thus, the scan frequency control module 138 divides the available frequency band of the receiver 1 into two frequency bands, and assigns the divided frequency bands to the second tuner control module 132 and the third tuner control module 137, respectively.

Next, with reference to FIG. 3 to FIG. 6, the full scan operation out of operations of the channel control module 124 of this embodiment will be described in detail. Operations of the receiver 2 according to the second embodiment are basically common to the operations of the receiver 1 (operations represented by the flowchart of FIG. 3) according to the first embodiment, and only the full scan operation (S42 of FIG. 3) is different. Accordingly, common items are denoted by common reference numerals, and duplicating descriptions are omitted.

When power is turned on in an initial state that the channel list 23*a* is not stored in the flash ROM 23, or when an instruction signal such as reset is inputted by the user via the input device 25, the CPU 22 instructs the channel control module 124 to generate a channel list. When instructed so, the first tuner control module 31 activates the first tuner 12*a* to start the NIT scan operation. For example, the first tuner control module 31 starts a frequency scan by predetermined frequency steps from the lowest frequency within the receivable frequencies of the first tuner 12*a* (step S41). The first tuner 12*a* sends a signal received during the frequency scan to the first tuner control module 31.

In parallel with starting the NIT scan operation by the first tuner control module 31, the second tuner control module 132 and the third tuner control module 137 activate the second tuner 12*b* and the third tuner 12*c*, respectively. When the second tuner 12*b* and the third tuner 12*c* are activated, the scan frequency control module 138 divides the available frequency band of the receiver 2 into two frequency bands (S61). This division may be performed by simply dividing the frequency band in two or by dividing the frequency band so that one frequency band is wider than the other in consideration of the frequency.

Subsequently, the scan frequency control module 138 assigns the divided frequency bands to the second tuner control module 132 and the third tuner control module 137, respectively (S62). The second tuner control module 132 and the third tuner control module 137 of this embodiment performs the full scan operation with respect to the entire given frequency band. Thus, when information of frequency bands is given by the scan frequency control module 138, preparation for the full scan operation is completed.

Then the second tuner control module 132 and the third tuner control module 137 control the second tuner 12*b* and the third tuner 12*c* respectively to perform the full scan operation of the entire frequency bands which are given respectively (S63).

Figure 3:
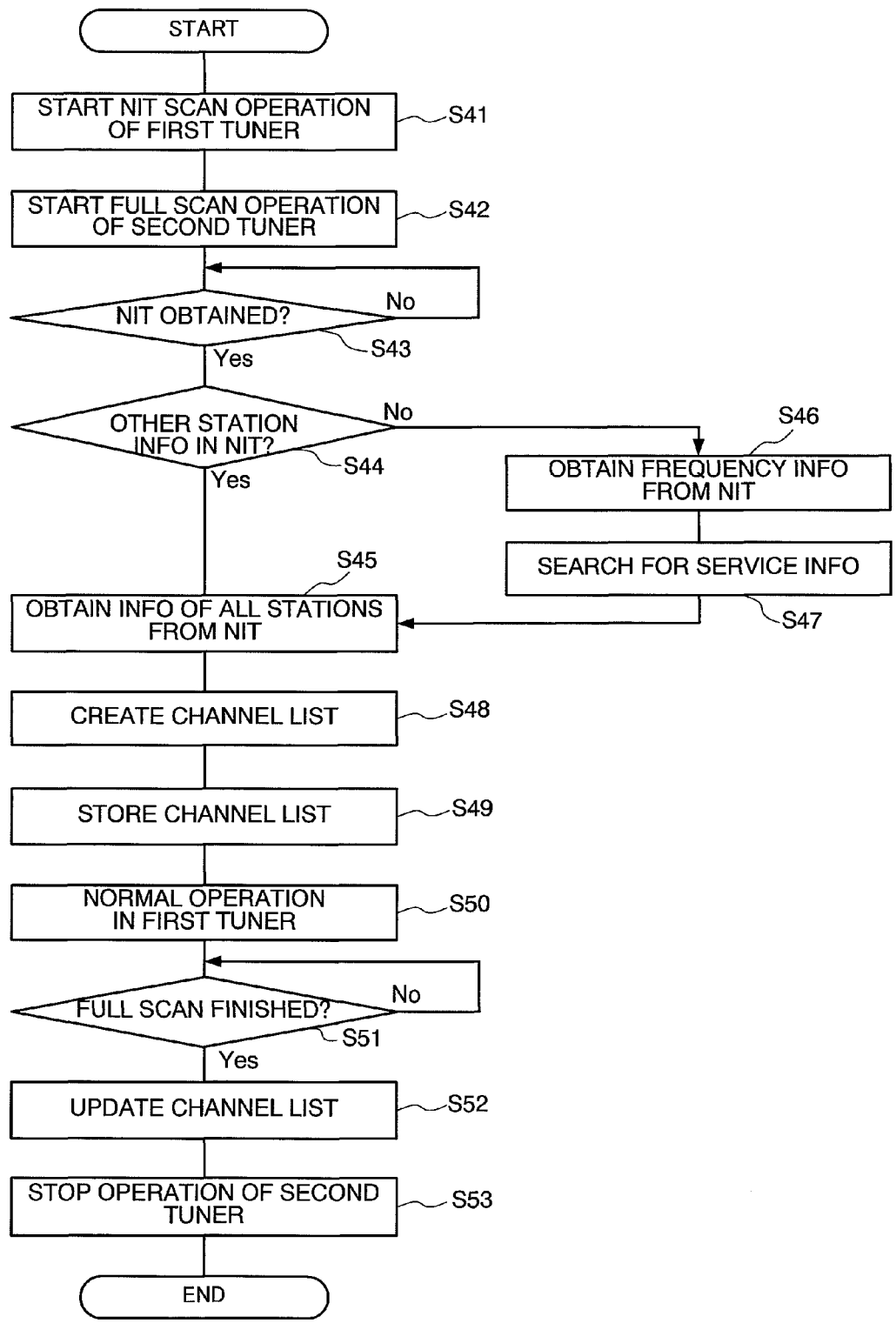
FIG. 3 is a flowchart showing a channel list generating operation of the receiver of the first embodiment.

Operations of the receiver 2 of the second embodiment after the full scan operations are started are common to the step 43 to the step 50 shown in FIG. 3.

When each of the second tuner 12*b* and the third tuner 12*c* finishes the scan of the entire assigned frequency bands (S51, Yes), the second tuner control module 132 and the third tuner control module 137 generate all band channel information corresponding to the entire frequency bands based on the received signals, the NIT, and any other information received from the second tuner 12*b* and the third tuner 12*c* during the full scan, and the generated all band channel information is sent to the channel list editing module 36. The channel list editing module 36 compares the channel list 23*a* stored in the flash ROM 23 with the all band channel information received from the second tuner control module 132 and the third tuner control module 137, and complements any information not included in the channel list 23a stored in the flash ROM 23 to update the channel list 23a (S52).

Once the channel list 23a is updated, the second tuner control module 132 and the third tuner control module 137 stop operations of the second tuner 12b and the third tuner 12c. Operations thereafter are common to those of the first embodiment.

With the receiver 2 of this embodiment, the frequency band to be fully scanned is divided into two frequency bands and the full scan is performed in parallel at once. Thus, the time until the channel list is finally updated can be shortened as compared to the first embodiment. Note that this embodiment has been described assuming that the full scan operation is performed by the two tuners, the second tuner 12b and the third tuner 12c. However, the present invention is not limited to this. Three or more tuners may be used for dividing a frequency band into narrower frequency band units to perform the full scan operation in parallel at once.

It should be noted that the present invention is not limited to the above-described embodiments and operation examples thereof. In other words, the present invention is not limited to the above-described embodiments as they are, and in the implementation phase, the present invention can be embodied with components being modified in the range not departing from the spirit of the invention. Various inventions can be formed by appropriately combining plural components disclosed in the above-described embodiments. For example, some components may be deleted from all the components shown in the embodiments. Furthermore, components ranging across different embodiments may be combined appropriately.

With the receiver and the receiving method according to the present invention, setting of available channels can be completed in a short time without omission.

What is claimed is:

1. A receiver configured to select a channel based on a channel list comprising channels, the receiver comprising:
   a memory configured to store the channel list;
   a first tuner configured to scan a partial frequency band out of a predetermined frequency band in order to receive first service information comprising information of a service corresponding to a first channel received in the scanning partial frequency band;
   a channel list generator configured to generate the channel list based on the first service information and to store the channel list in the memory;
   a second tuner configured to scan the entire frequency band of the predetermined frequency band in order to receive second service information comprising information of a service corresponding to a second channel received by the second tuner while scanning the predetermined frequency band simultaneously with the scanning by the first tuner; and
   a channel list updating module configured to update the channel list in the memory based on the second service information after the completion of the scanning by the second tuner.

2. The receiver of claim 1, further comprising:
   an input device configured to receive a command from a user,
   wherein the first tuner is configured to select a predetermined broadcast wave from the channels in the generated channel list after the completion of the scanning by the first tuner and the command received by the input device.

3. The receiver of claim 1,
   wherein the second tuner is configured to divide the predetermined frequency band into frequency bands,
   wherein the second tuner comprises a plurality of sub-tuners configured to scan the divided frequency bands, and
   wherein the second tuner is configured to combine scan results of the plurality of sub-tuners and to output a combined result.

4. The receiver of claim 1, further comprising:
   a demodulator configured to demodulate a signal from the first tuner,
   wherein the first tuner is configured to select a predetermined broadcast wave from the received channels in the generated channel list in the memory and to give the selected broadcast wave to the demodulator.

5. The receiver of claim 4,
   wherein the first tuner is configured to select a predetermined broadcast wave from the received channels in the generated channel list before the completion of the scanning by the second tuner, and to give the selected broadcast wave to the demodulator.

6. A receiving method in a receiver configured to select a channel based on a channel list comprising channels, the method comprising:
   scanning a partial frequency band out of a predetermined frequency band;
   scanning the entire frequency band of the predetermined frequency band in parallel with the scanning of the partial frequency band;
   receiving first service information comprising information of a service corresponding to the channel received while scanning the partial frequency band;
   generating the channel list based on the first service information and storing the generated channel list in the memory;
   receiving second service information comprising information of a service corresponding to the channel received by the second tuner while scanning the entire frequency band of the predetermined frequency band; and
   updating the channel list in the memory based on the second service information.

* * * * *